United States Patent [19]

Kitabayashi et al.

[11] Patent Number: 4,562,397
[45] Date of Patent: Dec. 31, 1985

[54] SQUIRREL-CAGE INDUCTION MOTOR

[75] Inventors: Yukio Kitabayashi; Noriyoshi Takahashi, both of Hitachi; Toshiaki Okuyama, Ibaraki; Masatoshi Watanabe; Hitoshi Ohura, both of Hitachi, all of Japan

[73] Assignee: Hitachi, Ltd., Tokyo, Japan

[21] Appl. No.: 634,538

[22] Filed: Jul. 26, 1984

[30] Foreign Application Priority Data

Jul. 29, 1983 [JP] Japan .................. 58-137738

[51] Int. Cl.$^4$ .............................. H02P 7/40
[52] U.S. Cl. .................... 318/814; 318/821; 310/68 B; 310/72; 310/211
[58] Field of Search ............ 310/212, 211, 166, 197, 310/180, 184, 198–208, 68 R, 68 A, 68 B, 71; 318/814, 821, 779

[56] References Cited

U.S. PATENT DOCUMENTS

| | | | |
|---|---|---|---|
| 1,050,445 | 1/1913 | Fynn | 310/212 X |
| 2,704,345 | 3/1955 | Jensen | 318/814 |
| 2,773,202 | 12/1956 | Jacobs | 310/211 |
| 2,828,457 | 3/1958 | Noodleman | 310/211 |
| 2,935,673 | 5/1960 | Herold | 310/212 |
| 3,027,474 | 3/1962 | Rosenberry | 310/211 |
| 3,676,764 | 7/1972 | Syverson | 310/198 |
| 4,371,802 | 2/1983 | Morrill | 310/212 |
| 4,442,368 | 4/1984 | Kupisiewitz | 310/211 |

FOREIGN PATENT DOCUMENTS 0094583 7/1980 Japan .

Primary Examiner—R. Skudy
Attorney, Agent, or Firm—Antonelli, Terry & Wands

[57] ABSTRACT

A squirrel-cage induction motor comprises a stator having a stator core and stator windings divided into first and second coils with different numbers of poles, and a squirrel-cage rotor including a rotor core and a plurality of rotor conductors embedded in the vicinity of the surface of the core. The number of the rotor conductors is the same as the average number of poles of the first and second stator coils, which conductors are arranged equidistantly along the periphery. This induction motor, with the construction of a squirrel-cage rotor, permits a variable speed operation without using any special device.

9 Claims, 13 Drawing Figures

SQUIRREL-CAGE INDUCTION MOTOR

BACKGROUND OF THE INVENTION

The present invention relates to a squirrel-cage induction motor, or more in particular to a squirrel-cage induction motor suitable for a motor driving a pump or a fan and the like.

Generally, induction motors are roughly classified according to the construction of a rotor into a wound-rotor induction motor and a squirrel-cage induction motor.

The squirrel-cage induction motor comprises a rotor so constructed that a bar conductor of considerable size is embedded in a slot of a rotor core and the end of the bar is provided with an end ring. With this construction, the squirrel-cage induction motor is mechanically rugged and high in weatherability, and therefore finds wide applications in various fields. Nevertheless, the squirrel-cage induction motor, which is driven at a predetermined speed based on a commercial frequency, is not suitable for the applications requiring rotations at variable speeds. If a variable speed control is desired by any means, a special device, that is, a frequency converter is used for changing the source frequency as disclosed in Japanese Patent Laid-Open No. 94583/80. The frequency converter is high in cost, and therefore the use thereof increases the production cost of the induction motor to the practical disadvantage. Further, the frequency converter has a limited capacity, thereby tending to limit the capacity of the induction motor.

In the case of the wound-rotor induction motor, on the other hand, the speed control is possible without a frequency converter, and due to the additional advantage of a large starting torque, finds wide applications with pumps or fans and the like. Another advantage of the wound-rotor induction motor is that it can be operated while dampening the starting current unlike in the squirrel-cage induction motor. Specifically, a current 3 to 5 times larger than the rated current flows in the squirrel-cage induction motor at the time of starting, posing the problems of the increase in winding temperature and the difficult smooth increase of speed, while the wound-rotor induction motor can be started smoothly while dampening the starting current by controlling the secondary resistance.

In spite of the many advantages of the wound-rotor induction motor from the viewpoint of operation as mentioned above, it has a number of structural shortcomings. Specifically, in view of the fact that the rotor is wound with the secondary coil, the particular coil or especially the coil ends are subjected to a large outward component of force attributable to the centrifugal force of rotation, thereby weakening the mechanical construction of the motor. Further, the rotor is provided with a collector including a brush and a slip ring for control of the secondary coil, so that a spark is liable to occur from the collector due to the sliding between the brush and slip ring, thus making the motor unusable in an unfavorable environment. Furthermore, the collector device requires great labor and time of maintenance and inspection.

In view of these facts, an ideal induction motor would be the one having the operating advantages of the wound-rotor induction motor and the rugged construction of the squirrel-cage induction motor. In other words, an induction motor having a squirrel-cage rotor and the same functions as the wound-rotor induction motor would be most desirable.

SUMMARY OF THE INVENTION

The present invention has been developed in view of this, and the object thereof is to provide a squirrel-cage induction motor comprising a squirrel-cage rotor and provided with the same functions as the wound-rotor induction motor.

According to the present invention, there is provided a squirrel-cage induction motor comprising stator windings including first and second stator coils with different numbers of poles, and a rotor conductor or rotor conductors equal to the average number of poles of the first and second stator coils, the rotor conductors being arranged equidistantly along the periphery of the rotor core. An AC system is connected to the first stator coil and a means for controlling a current flowing through the second stator coil is connected to the second stator coil.

DESCRIPTION OF THE PREFERRED EMBODIMENTS

Figure 1:
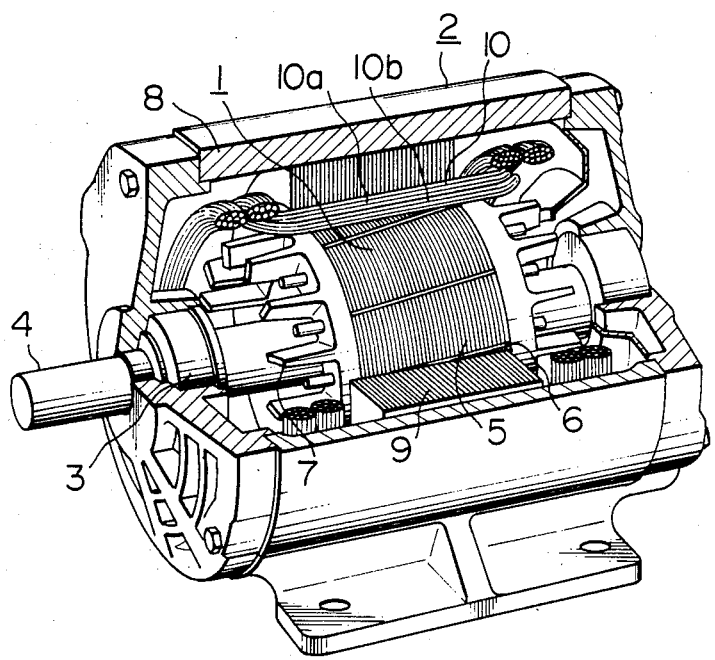
FIG. 1 is a partially cutaway perspective view of a squirrel-cage induction motor according to the present invention.

The present invention will be described below in detail with reference to embodiments shown in the drawings. FIG. 1 shows a partially cutaway view of a squirrel-cage induction motor according to the present invention. This squirrel-cage induction motor comprises a rotor 1, a stator 2 and a bearing 3.

The rotor 1 includes a rotor shaft 4, a rotor core 5 fixed on and rotating with the rotor shaft 4, and a rotor conductor 6 arranged in a special relation (which will be described later) with the stator 2. In the drawing, reference numeral 7 designates a cooling fan.

Figure 2:
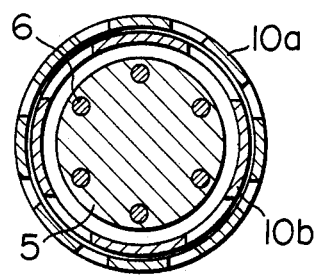
FIGS. 2 and 3 are sectional views showing the relation between the stator winding and the rotor winding of the motor shown in FIG. 1.

The stator 2 includes a housing 8, a stator core 9 held in the housing, and a stator winding 10 wound and held along the inner periphery of the stator core. In this case, the stator winding 10 is formed of two types of stator coils, that is, a first stator coil 10a and a second stator coil 10b. These stator coils are wound in different number of poles, for example, as shown in FIG. 2, when the number of poles of the first stator coil 10a is eight poles, the second stator coil 19b is wound so that the number of poles thereof is different, such as four poles.

This construction of the stator winding 10 including two types of stator coils in different numbers of poles is very important for the purpose of the present invention. Another important fact is the above-mentioned special relation of arrangement between the rotor conductors 6 and the stator. Specifically, the rotor conductors 6 are not a given number of conductors bars but the number thereof is equal to the average of the numbers of the poles formed by the first and second stator coils 10a and 10b. This point will be explained more in detail with reference to FIG. 2.

Figure 3:
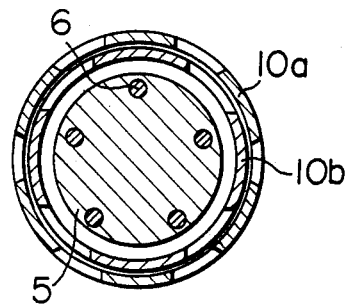

Assuming that the first stator coil 10a has eight poles, the second stator coil 10b is required to have poles in a number different from eight. Assume, for example, that the number of poles of the second stator coil 10b is four. The rotor conductors 6 are provided in a number equal to the average of the numbers of the poles of the first and second stator coils 10a and 10b, that is, six conductors are arranged equidistantly at predetermined intervals along the periphery of the rotor. FIG. 3 shows another example in which the first stator coil has six poles, the second stator coil has four poles, and there are five rotor conductors.

Figure 4:
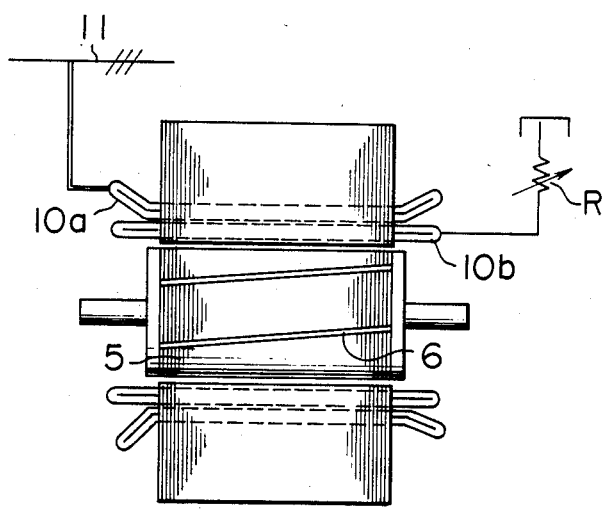
FIG. 4 is a diagram showing a system of resistance control of the squirrel-cage induction motor.

FIG. 4 shows a system for the secondary resistance control of the squirrel-cage induction motor constructed as above. The first stator coil 10a is connected to a three-phase AC system 11, and the second stator coil 10b is connected to a means R for controlling a current flowing through the second stator coils, such as variable resistor. Under this condition, the rotational speed of the motor can be changed by controlling the resistance of the variable resistor R for the reasons and on the principle explained later.

Now, the reasons why the rotational speed can be changed and the principle on which the motor operate, together with the processes we have gone through before this invention will be explained below.

In an ordinary wound-rotor induction motor subject to secondary control, the secondary resistance is controlled through a brush and a slip ring. If the secondary resistance is to be controlled without brush or contact, however, a rotor current is required to generate magnetomotive force responsive to the second stator coil by some means when the first stator coil 10a is assumed to be the primary. In other words, it is necessary that the magnetomotive force in the air gap between the stator and the rotor is required to contain components corresponding to the number of poles of the first and the second stator coils.

Figure 5:
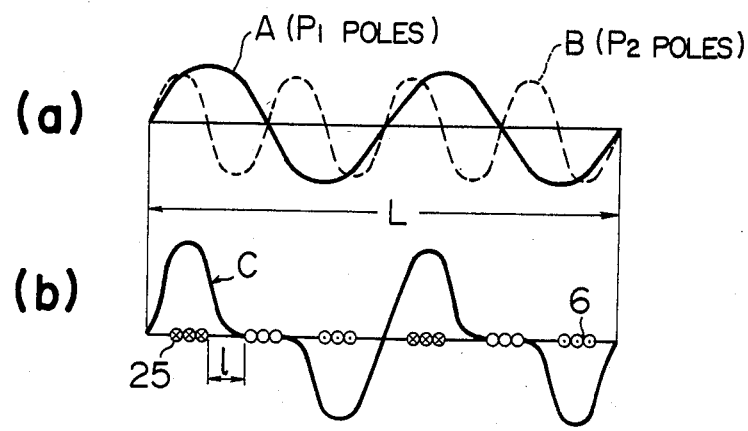
FIGS. 5 to 7 are diagrams for explaining the operating principle of the motor.

Let us consider the case where a rotating magnetic field as shown in FIG. 5(a) is generated in the gap by the first and second stator coils. The symbol L in the drawing represents the whole periphery, that is, the length of one revolution. In this drawing, the rotary magnetic field A of poles $P_1$ (assumed to be four) is shown to have been generated by the first stator coil 10a, and the rotary magnetic field B of poles $P_2$ (assumed to be eight) is shown to have been formed by the second stator coil 10b at the same time. In this case, the two rotary magnetic fields A and B are interposed on each other, so that the magnetic intensity is increased at some parts and decreased by being offset at other parts, thus forming a distribution of substantial magnetomotive force in the gap as shown in FIG. 5(b). A current corresponding to this distribution of magnetomotive force flows in the rotor conductors. The symbols ⊗, ⊙, and ○ in the drawing indicate the flows of current in the rotor conductors. In order that the rotor current corresponding to the distribution of magnetomotive force of FIG. 5(b) may flow through the rotor conductors arranged at equal intervals, the rotor conductors 6 are arranged equidistantly at a predetermined interval as shown by ⊗, ⊙, and ○ in FIG. 5(b) in the simplest way.

Figure 6:
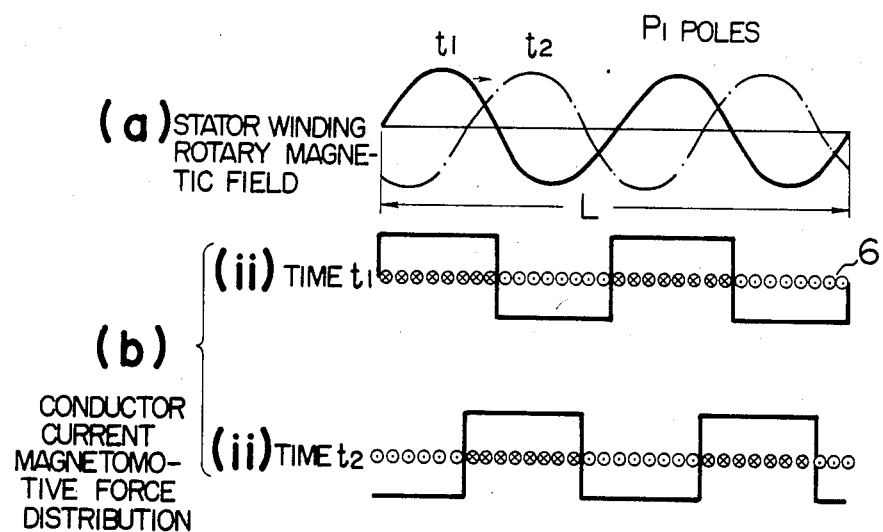

On the basis of this concept, comparative study will be made below of a conventional squirrel-cage rotor incapable of speed control and a squirrel-cage rotor capable of speed control according to the present invention from the viewpoint of the magnetomotive force generated. In a uniform arrangement of rotor conductor bars of a conventional squirrel-cage rotor as shown in FIG. 6, although a rotary magnetic field is created by the primary winding, currents flow in such a manner that as shown in FIG. 6(b), most of the magnetomotive force is attributable to the poles $P_1$ in the same number as the poles of the primary winding, while the component of magnetomotive force corresponding to the poles $P_2$ is not generated substantially.

Figure 7:
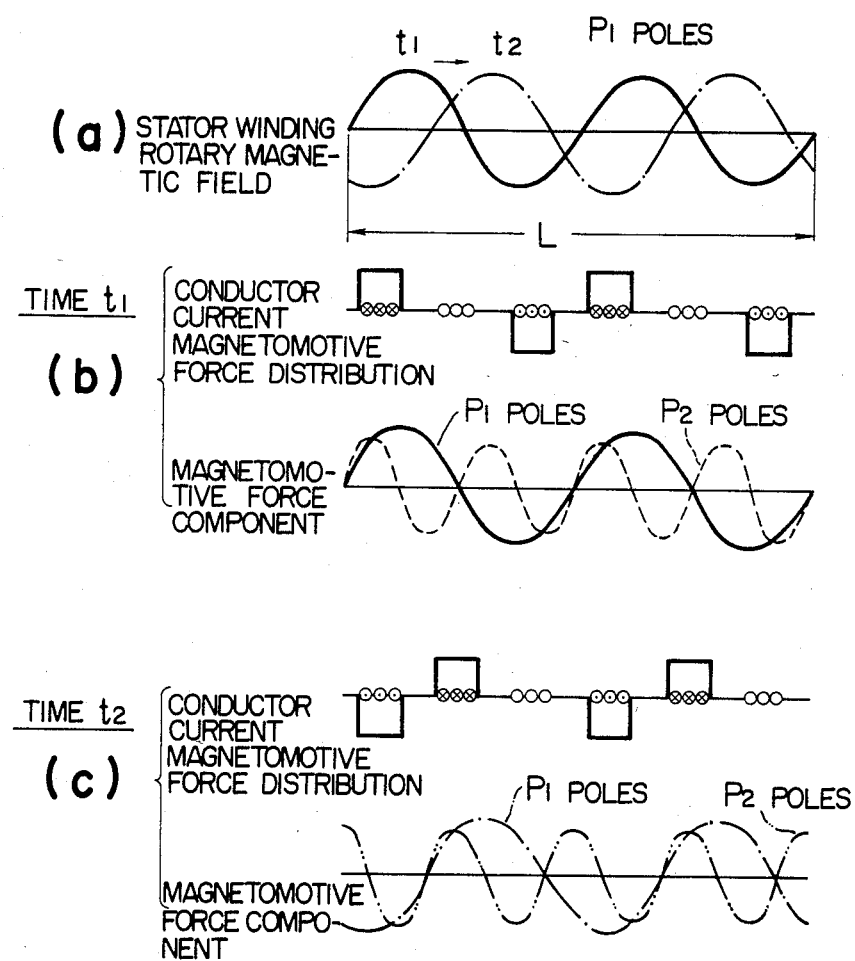

On the other hand, the manner of distribution in which magnetomotive force is generated in the squirrel-cage rotor according to the present invention is shown in FIG. 7. In the case where a rotary magnetic field of poles $P_1$ as shown by the solid line is generated in the stator winding at time $t_1$, a current as shown in FIG. 7(b) flows in the rotor conductor bars to generate a magnetomotive force. A development of this magnetomotive force in Fourier series apparently shows components of both the poles $P_1$ and $P_2$, although there exist in it a multiplicity of high harmonics. The component of magnetomotive force and the rotor conductor bar current generated at time $t_2$, shown in FIG. 7(c), similarly contain the magnetomotive force components of both the poles $P_1$ and $P_2$ as at time $t_1$. This holds true also when the rotary magnetic field of poles $P_2$ is applied to the first stator winding, in which case the magnetomotive force generated in the gap contains the components of both the poles $P_1$ and $P_2$.

Figure 8:
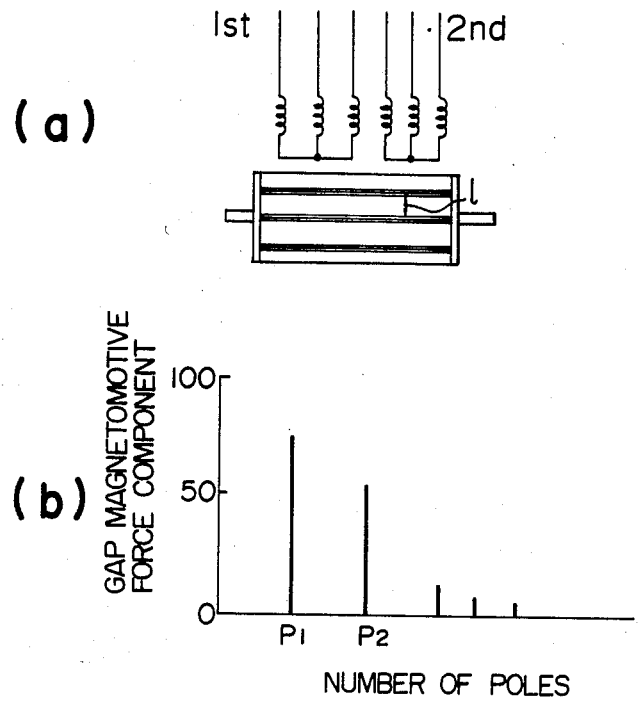
FIG. 8 is a diagram showing the relation between the rotor conductors and the number of poles of the stator windings.

The relation between the conductor interval and the number of poles is shown in FIG. 8. The drawing shows the case in which the number of poles of the first stator windings is $P_1$, and that of the second stator winding is $P_2$. FIG. 8(b) shows an analysis of the ratio of the magnetomotive force component obtained in the gap when the number N of the intervals of the rotor conductors is $N=\frac{1}{2}(P_1+P_2)$. In the shown case, the components of poles $P_1$ and $P_2$ are seen to be contained in a sufficiently large ratio (50% or more). In the event that the relation $N=\frac{1}{2}(P_1+P_2)$ of the conductors is not satisfied, however, both the components $P_1$ and $P_2$ never present themselves in a ratio larger than 50% at the same time. In the description above, the amplitude of actual gap magnetomotive force wave before development of Fourier series is assumed to be 100%.

In order to confirm the result of analysis shown in FIG. 8, several different induction motors of about 3.7 KW with different arrangements of rotor conductor bars were test-produced. It has been confirmed that only those arrangements which satisfy the above-mentioned relation permits the secondary resistance control on the primary side (stator side). Satisfactory examples include pairs of the first and second stator windings with four and eight poles and six rotor conductors, or with four and six poles and five rotor conductors respectively. Even the use of the same stator windings, by contrast, does not produce the theoretically sought function if the number of the rotor conductors N, that is, the number of intervals l between the conductors fails to satisfy the condition $N=\frac{1}{2}(P_1+P_2)$ such as in an ordinary squirrel-cage rotor.

Figure 9:
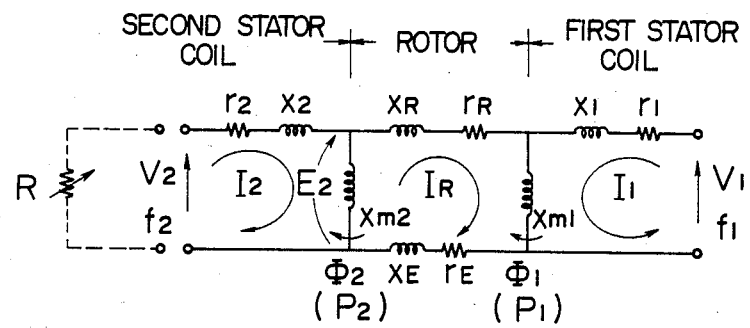
FIG. 9 is a diagram showing an equivalent circuit of a squirrel-cage induction motor according to the present invention.

An equivalent circuit of an induction motor according to the present invention is shown in FIG. 9. With reference to this diagram, the relation between the voltages, currents and frequencies at various parts of the rotor and the two stator windings will be explained.

When a voltage $V_1$ of frequency $f_1$ is applied to the first stator coil, a current $I_1$ of frequency $f_1$ flows in the first stator coil. This current generates a rotary magnetic field of $P_1$ in the number of poles, so that magnetic fluxes $\phi_1$ is crosslinked with the rotor conductors. As a result, a current $I_R$ flows in the rotor conductors. The frequency of this current $I_R$ is a slip frequency $s_1 f_1$. This slip $s_1$ occurs between the stator winding and the rotor. The magnetomotive force generated in the gap by the rotor current $I_R$ contains $P_2$ component which creates a rotary magnetic field of $P_2$ poles. This rotary magnetic field crosslinks the second stator coil to supply current $I_2$. In the drawing, character $r_1$ designates the winding resistance of the first stator coil, $x_1$ the leakage reactance of the first stator coil, $r_R$ the resistance of the rotor conductors, $x_R$ the leakage reactance of the rotor conductors including the leakage due to the spatial high harmonics, $r_E$ the resistance of the end ring, and $x_E$ the leakage reactance of the end ring. Further, character $r_2$ designates the winding resistance of the second stator coil and $x_2$ the leakage reactance of the second stator coil.

The secondary resistance in this induction motor is controlled by an additional circuit shown by dotted line in the equivalent circuit of this drawing. Numeral R designates a variable resistor.

Let $s_2$ be the slip between the second stator coil and the rotor, and the frequency $f_2$ of the current flowing in the second stator coil is expressed by following equation.

$$f_2 = \frac{s_1}{s_2} f_1 = s^* f_1 = f_1 - \frac{N_R}{120}(P_1 + P_2) \quad (1)$$

where $s^*$ will be called an equivalent slip hereinafter. Equation (1) is indicative of the same situation as if the second stator coil rotates an equivalent slip $s^*$ behind the first stator coil, which involves a synchronous speed corresponding to the number of poles equivalent to the sum of the first and second stator coils.

Thus the torque $\tau$ is given by $$\tau = K_0' E_2^2 \frac{\left(\frac{r_2 + R}{s^*}\right)}{\left(\frac{r_2 + R}{s^*}\right)^2 + X_2^2} \quad (2)$$

This indicates that the equivalent slip $s^*$ can be controlled corresponding to the rotational speed by changing the resistance R with the variable resistor R. In other words, an apparent secondary resistance control becomes possible on the primary side. Further, the secondary frequency control is possible as in the wound-rotor induction motor. The voltage or frequency control or change of the number of poles from the primary side is of course also possible.

As described above, according to the embodiment under consideration, it will be seen that an induction motor equipped with the same functions as the wound-rotor induction motor is realized with the construction of a squirrel-cage rotor. The speed control system such as secondary resistance control which is possible with the wound-rotor induction motor is entirely practicable, thereby eliminating the need of maintenance and inspection of the brush which imposes a problem in the wound-rotor induction motor.

The foregoing description involves cases with a single rotor conductor for facilitating the relation with the poles of the stator winding. The number of rotor conductors, however, is not limited to one but a single conductor may of course be divided into a plurality of conductors or parts for the purpose of the present invention.

Figure 10:
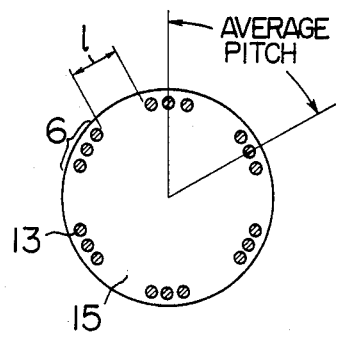
FIGS. 10 to 13 are sectional views of the rotor of the induction motor according to the present invention.

An example shown in FIG. 10 involves six rotor conductors, each of which is formed of three strands. In this case, the average pitch of the rotor conductors 6 and the distance l between adjacent rotor conductors are specified by a special relation with the number of poles of the stator coils. Specifically, let $P_1$ be the number of poles of the first stator coil and $P_2$ the number of poles of the second stator coil. And the average pitch of the rotor conductors is given as about $2/(P_1 + P_2)$ of the circumference of the average diameter of the conductors. It is also necessary to provide $\frac{1}{2}(P_1 + P_2)$ intervals l of predetermined length between adjacent rotor conductors. In the shown example having four poles $P_1$ and eight poles $P_2$, the average pitch is 1/6 the peripheral length and six intervals l exist along the whole circumference.

Figure 11:
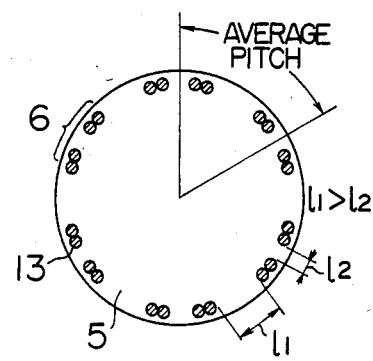
Figure 12:
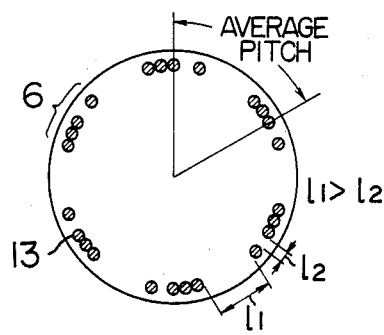

Further, in FIGS. 11 and 12, there are shown examples of modifications of the rotor having a plurality of strand conductors. In FIG. 11, the number of rotor conductors is six, and these rotor conductors are arranged along the periphery with intervals each corresponding to $l_1$. Each rotor conductor 6 is composed of four strand conductors 13, and in particular in this case, the intervals of the strand conductors 13 along the periphery are not uniform, and there are some strand conductors which are disposed with an interval of $l_2$ along the periphery. Even in such a case, similar effects can be obtained as in the case of FIG. 10. However, in this case, it should be noted that the strand conductors are arranged so that a relationship between the interval $l_1$ and the interval $l_2$ always meets $l_1 > l_2$. Thus, even a conductor 6 formed of a plurality of strand conductors having a nonuniform spacing therebetween is considered a rotor conductor so long as the aforementioned relationship is met.

Figure 13:
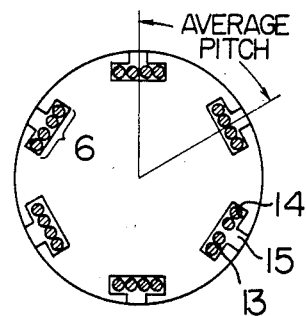

In FIG. 12, also in this case the number of rotor conductors is six, and each rotor conductor 6 is composed of four strand conductors. However, a particular arrangement in this case resides in that one strand conductor among four strand conductors is spaced from an adjacent strand conductor with an interval of $l_2$. Even in such an arrangement, similar effects can be obtained as in FIG. 10. Needless to say that the strand conductors are arranged so that the relationship between the interval $l_1$ and the interval $l_2$ meets $l_1 > l_2$. Also, a rotor slot 14 containing a plurality strand conductors 13 as shown in FIG. 13 is considered a single rotor conductor. Numeral 15 designates a slit formed for reduction of magnetic fluxes. In FIGS. 10 to 13, the relation always exists that the average pitch of the rotor conductors 6 is substantially $2/(P_1 + P_2)$ of the peripheral length on the average diameter of the rotor conductor.

It will be understood from the foregoing description variously made, that a squirrel-cage induction motor according to the present invention comprises a stator winding including first and second coils having different numbers of poles, and a rotor including rotor conductors equivalent to the average number of poles of said first and second stator coils, the rotor conductors being arranged equidistantly along the periphery, wherein a variable speed operation is possible by connecting an AC power supply to the first stator coil and connecting a means for controlling a current of the second stator coil to the second stator coil such as a variable resistor, thus providing a squirrel-cage induction motor having the same function as the wound-rotor induction motor in spite of the former having the rotor of squirrel-cage type.

We claim:

1. In a squirrel-cage induction motor comprising: a squirrel-cage rotor including a rotor core and a plurality of rotor conductors embedded in the vicinity of the surface of said rotor core; and a stator arranged in predetermined spaced relationship with said squirrel-cage rotor and including a stator core and a stator winding, wherein said stator winding includes first and second stator coils different in the number of poles from each other, said first stator coil is connected to an AC system, said second stator coil is provided with means for controlling a current flowing through said second stator coil, and said rotor conductors in the number equivalent to the average number of poles of said first and second stator coils are arranged equidistantly along the periphery.

2. A squirrel-cage induction rotating electric machine according to claim 1, wherein each of said rotor conductors is divided into several parts.

3. A squirrel-cage induction rotating electric machine according to claim 1, wherein said means for controlling a current flowing through said second stator coil comprises a variable resistor connected to said second stator coil.

4. A squirrel-cage induction rotating electric machine according to claim 1, wherein said AC system is a multiphase AC system.

5. A squirrel-cage induction rotating electric machine according to claim 4, wherein said means for controlling a current flowing through said second stator coil comprises a variable resistor, the resistance of the variable resistor being controlled for changing the rotational speed of the motor.

6. A squirrel-cage induction rotating electric machine according to claim 5, wherein each of said rotor conductors is divided into several parts.

7. A squirrel-cage induction rotating electric machine according to claim 6, wherein each of said rotor conductors is formed of a plurality of strands.

8. A squirrel-cage induction rotating electric machine according to claim 7, wherein each rotor conductor comprises at least three strands, one of the strands of each rotor conductor being spaced from another strand by a distance greater than a distance between the another strand and a further strand of said rotor conductor.

9. A squirrel-cage induction rotating electric machine according to claim 2, wherein each of said rotor conductors is divided into several parts in the form of a plurality of strands.

* * * * *